(12) United States Patent
Tomimbang

(10) Patent No.: US 8,925,589 B2
(45) Date of Patent: Jan. 6, 2015

(54) ACTIVE FLOW HIGH PRESSURE PIPE PLUG APPARATUS AND METHOD

(76) Inventor: Wendell E. Tomimbang, Kissimmee, FL (US)

( * ) Notice: Subject to any disclaimer, the term of this patent is extended or adjusted under 35 U.S.C. 154(b) by 1088 days.

(21) Appl. No.: 12/822,686

(22) Filed: Jun. 24, 2010

(65) Prior Publication Data

US 2011/0315258 A1 Dec. 29, 2011

(51) Int. Cl.
  *F16L 55/12* (2006.01)
  *F16L 55/128* (2006.01)
  *F16L 55/132* (2006.01)

(52) U.S. Cl.
  CPC ........... *F16L 55/1283* (2013.01); *F16L 55/132* (2013.01)
  USPC .................................. 138/93; 138/89; 138/90

(58) Field of Classification Search
  CPC ........ F16L 55/128; F16L 55/124; F16L 55/12
  USPC .............................................. 138/93, 98, 89
  See application file for complete search history.

(56) References Cited

U.S. PATENT DOCUMENTS

| | | | | |
|---|---|---|---|---|
| 4,372,161 A * | 2/1983 | de Buda et al. | | 73/865.8 |
| 4,423,754 A * | 1/1984 | Carter, Jr. | | 138/93 |
| 4,429,720 A * | 2/1984 | Beck et al. | | 138/97 |
| 4,660,603 A * | 4/1987 | Tash | | 138/92 |
| 4,660,644 A * | 4/1987 | Egnor | | 166/285 |
| 4,790,356 A * | 12/1988 | Tash | | 138/93 |
| 5,234,034 A * | 8/1993 | Lyon | | 138/93 |
| 5,427,153 A * | 6/1995 | Tash | | 138/93 |
| 5,867,547 A * | 2/1999 | Lee | | 376/204 |
| 7,717,137 B2 * | 5/2010 | Bednarzik | | 138/93 |
| 8,430,810 B2 * | 4/2013 | Hassidov et al. | | 600/116 |

* cited by examiner

*Primary Examiner* — Patrick F Brinson
(74) *Attorney, Agent, or Firm* — The Miller Law Offices PLC; Steven J. Miller, Esq.

(57) ABSTRACT

The invention herein presented involves two (2) alternative equipment and methods which could be used independently or together, depending on the application and means available to have them implemented, for plugging or stopping active flow of fluid from a damaged or broken pipeline, said pipeline possibly being located at depths of thousands of feet in ocean water.

10 Claims, 3 Drawing Sheets

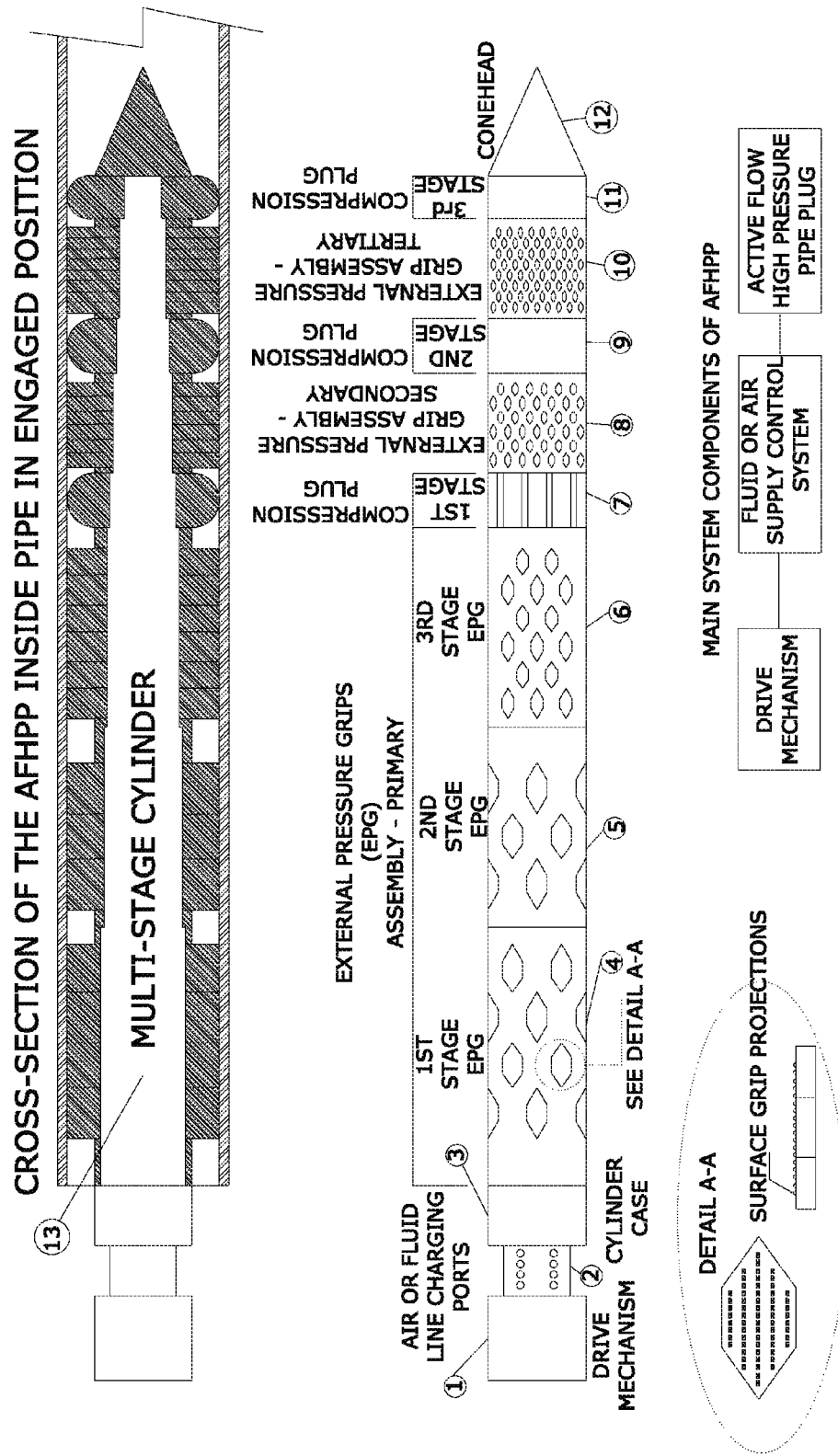

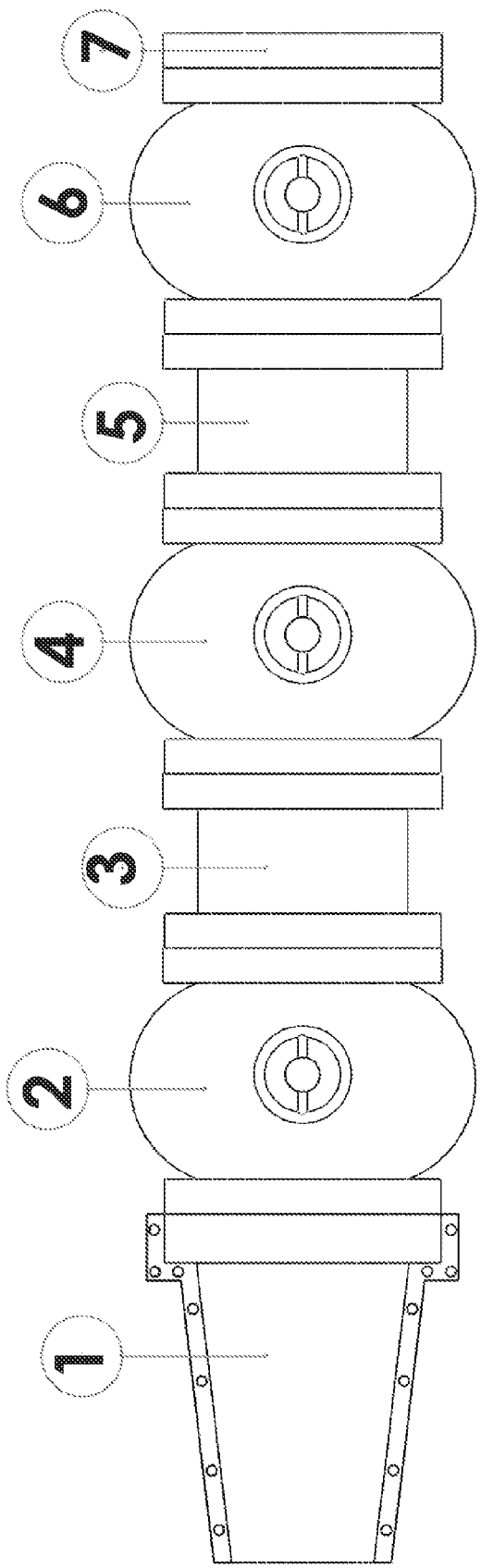

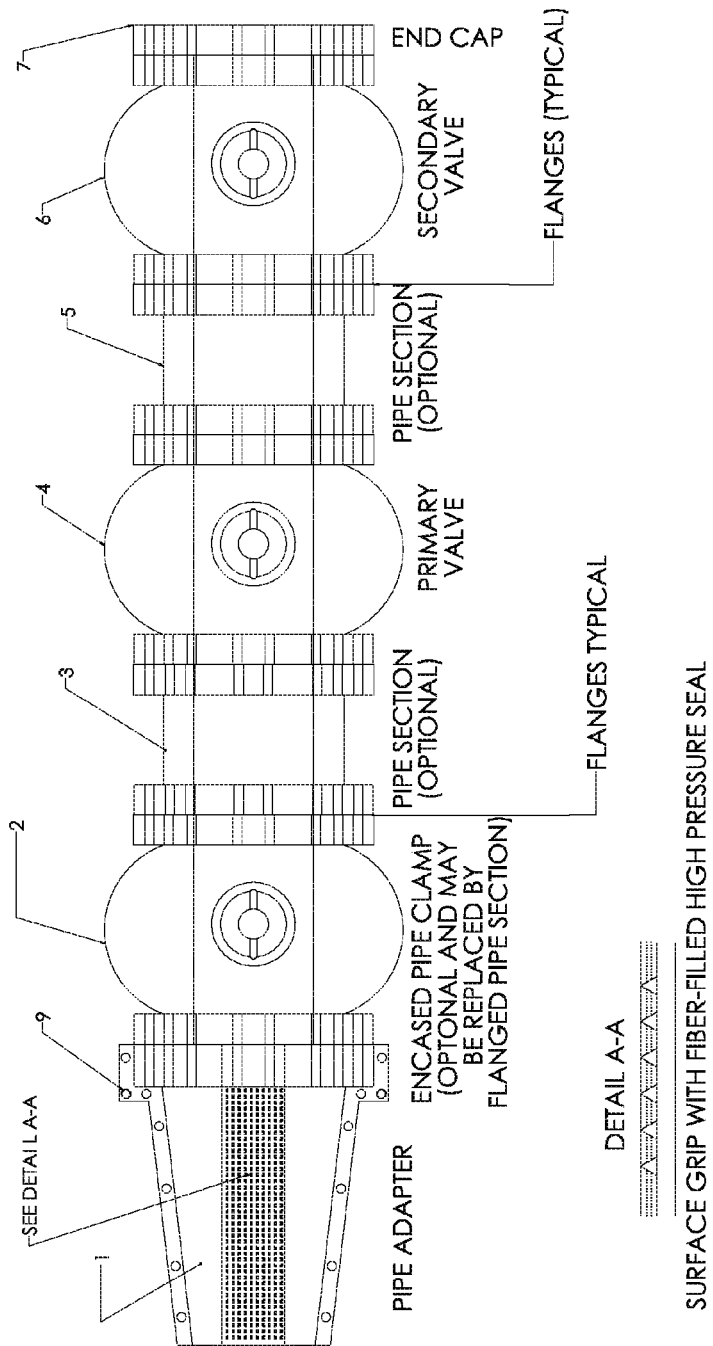

ACTIVE FLOW HIGH PRESSURE PIPE PLUG APPARATUS AND METHOD

CROSS REFERENCE TO RELATED APPLICATIONS

None.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

Field of the Invention

The present invention relates to equipment and methods of plugging or capping the active flow of fluids in a piping system with inoperable or without installed flow control means. Valves are normally used to stop the flow of fluid in a piping system, however, in special situations that valves become inoperable, or when there is a pipe break with no means to stop the flow of fluid in the piping system, special plugging or capping mechanisms and methods are necessary. The flow of fluid and the associated high pressure in the piping system makes it very difficult to plug the system, especially so with oil or other fluids when pipe breaks or where the control equipment or valves are inoperable.

BRIEF SUMMARY OF THE INVENTION

The invention herein presented involves two (2) alternative apparatus and methods which could be used independently or together, depending on the application and means available to have them implemented. They are thus described as follows:

The first alternative apparatus and method involves an Active Flow High Pressure Pipe Plug, hereinafter referred to as the AFHPP, which can be inserted into a pipe with active fluid flow. The AFHPP is essentially smaller in diameter than the pipe being plugged and employs multi-stages of pneumatic or hydraulic cylinders operated to perform various functions of the plugging sequence. The AFHPP could be operated by hydraulic or pneumatic cylinders or any other mechanical means to perform the same functions as described. The AFHPP is provided with multi-stages of external grips which are activated by the multi-stage cylinders, and said grips are set in arrays of varied spacing in different stages to serve as anchors or grips to the internal wall of the pipe being plugged. These external grips are shaped at both ends to minimize pressure from fluid flow and are provided with surface projections that press against the pipe internal wall. These external grips are made of materials and/or alloys suitable to the specific application. The external grips are increased in number and spacing decreased between them at the later stages to minimize pressure to the expandable plugs before they get activated. The AFHPP is provided with multi-stages of expandable plugs made of rubber, elastomeric, or other materials that suits the application and the fluid in the pipeline. These plugs are activated by various cylinder stages. When all the cylinders are fully engaged, the AFHPP shall have all its various stages of grips anchored into the pipe internal wall, and all the expandable plugs pressing against the internal wall of the pipe, thus plugging the flow of fluids in the pipe. The AFHPP may be driven into the pipe by guided propulsion equipment, or any other mechanical driving methods that could counter the partial pressure of the fluid flow into the pipe before it is completely plugged. The AFHPP is smaller in diameter than the internal diameter of the pipe being plugged and properly sized to allow driving it with reduced resistance under pressure from fluid flow. Actual construction of the AFHPP may slightly vary without departing from the principles explained herein, providing additional features to address particular application requirements. This is a re-usable equipment and method and therefore is intended for temporary use until permanent plug or cap is installed in the pipe. It may also be used as permanent plug provided pneumatic or hydraulic supply line is maintained.

The $2^{nd}$ alternative apparatus and method involves an Active Flow High Pressure Pipe Cap assembly, hereinafter called AFHPC which employs a series of valves, optional encased pipe clamp, pipe sections, pipe adapter assembly, flanges, bolts, seals, gaskets, accessories and fixtures. A minimum of two (2) valves, of the type, rating and materials suitable for the application are used. These valves may be driven pneumatically, hydraulically or by any mechanical means. The valves are assembled in series with or without a pipe section between them, and sized much bigger than the pipe being capped. The valve assembly is flanged in series with an externally activated encased pipe clamp that is composed of a minimum of two internal opposing sections which may be driven manually, pneumatically, hydraulically or by any other mechanical means. The encased pipe clamp may be operated by external wheel or wheels that drive the opposing clamps. The encased pipe clamp is optional and may be replaced by a flanged pipe section of suitable length to provide enough working space between the pipe adapter and the end of the pipe being capped.

The pipe adapter, of internal diameter matching the outside diameter of the pipe being capped, has one end flanged and sized to mate with the encased clamp and valve assembly. This pipe adapter is intended to grip the pipe being capped and secure the valve assembly. Surface preparations may be required to the pipe being capped before the pipe adapter is installed. Additional mechanical fixtures and methods may be required to insure that the adapter grips the pipe securely and be able to sustain the pressure of the fluid in the pipe once the valves are closed. The adapter is made with two (2) half sections that are bolted together in situ with gaskets and seals suitable to the application and the pressure it is intended for use. The adapter is first installed and positioned where the encased clamp would be close to the end of the pipe being capped. The assembled encased pipe clamp and valves in fully open position is slipped over the pipe being capped, mated and bolted with the pipe adapter installed in place. Alternative fixtures may be used in lieu of nut and bolt assemblies to secure flange connections and pipe adapter. Since the encased clamp and valve assembly is sized for much bigger diameter than the pipe being capped, there should be no resistance while it is being slipped over the pipe. The encased clamp is then activated to secure the assembly with the end-section of the pipe being capped. The primary valve is then closed and the secondary valve follows. At this point the pipe is totally capped. If needed, by-pass valves may be used before or within the valves to minimize pressure during the closure of the primary valve. The assembly uses flanged connections, however, alternative methods and means maybe employed to attain the same objectives. The pipe adapter is designed such that it creates permanent grip to the pipe being capped, and where necessary, additional mechanical fixtures may be required to support its grip and avoid slippage which may be caused by the fluid pressure when the pipe is capped. Alternatively or when desired, the secondary valve may be used for future connections to the pipe and the end cap removed.

The above equipment and methods may be used in tandem whereby the AFHPP is installed to provide temporary plug to the pipe being plugged while the AFHPC is being installed to provide permanent capping solution.

BRIEF DESCRIPTION OF THE DRAWINGS

The drawings constitute part of this specification and include exemplary embodiments to the invention, which may be embodied in various forms. It is to be understood that in some instances various aspects of the invention may be shown exaggerated or enlarged to facilitate an understanding of the invention.

FIG. 1 comprises elevation views of the main system components, top view and cross-section of the AFHPP. The representations are pictorial and actual construction may vary according to detailed design requirements to meet specific applications. Cylinder configuration may vary to activate the external pressure grips and plugs.

FIG. 2 is an elevation view of the main components and construction of AFHPC. The representations are pictorial and actual construction may vary according to detailed design requirements to meet specific applications.

FIG. 3 is an elevation view of additional details of the main components and construction of AFHPC. The representations are pictorial and actual construction may vary according to detailed design requirements to meet specific applications.

DETAILED DESCRIPTION OF THE EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

AFHPP Operation:

The AFHPP is secured to the drive mechanism (1) which could be mobile equipment inland or underwater, or guided propulsion equipment that could counter the pressure from fluid flow while the AFHPP is being inserted into the pipe being plugged. The pneumatic or hydraulic supply line/s are connected to the charging port or ports (2). Multi-stage external pressure grips (EPG), (4), (5), (6) are provided and the number of stages could be varied as actual application may call for. At rest, all external pressure grips (4), (5), (6) are in flush position with the AFHPP casing.

Multi-stage plugs (7), (9), (11), are compression type plugs where the external diameter increases as they are compressed by the cylinder action. The number of plug stages may be varied as the application may call for. The first stage plug is grooved along the direction of fluid flow to minimize pressure. External pressure grips (8), (10), are provided after the first and second stage plugs to provide additional grip to the external wall at the plug sections. Conehead (12) is provided at the tip section of the AFHPP. All materials and fixtures are made and designed to suit the applications. The AFHPP outside diameter is smaller than the inside diameter of the pipe being plugged. The AFHPP is driven into the pipe being plugged until the first stage EPG section (4) is fully inside. The first stage cylinder is activated and the external pressure grips get secured to the pipe wall. The second and succeeding cylinders activate the other external pressure grips further securing the AFHPP into the pipe wall. The first stage compression plug (7) is then activated, immediately followed by the secondary external pressure grips section (8). The second stage compression plug (9) is then activated followed by the tertiary external pressure grips section (10). The final stage compression plug (11) is then activated completing the operation. The full operation is performed in the sequence thus explained in very short amount of time depending on actual design.

AFHPC Operation

The encased clamp (2) or alternatively a flanged pipe section, primary valve (4) and the secondary valve (6) without the blank plate are assembled. A pipe section (3) is provided between the encased clamp and the primary valve.

A pipe section (5) is optional between the primary and secondary valves. The encased clamp (2) is externally driven and is intended to clamp the pipe being capped and support the valves assembly. The assembly of encased clamp and valves are sized much bigger than the pipe being capped to easily slip it over without imposing any resistance from fluid flow. Especially for underwater applications where working conditions around the pipe end poses so much risk to operators, an assembly of fittings with internal diameters much bigger than the pipe being capped is required. The pipe adapter is installed over the pipe being capped, suitably in a position where the encased clamp would be near the pipe end when installed. The pipe adapter is provided with gaskets, seals and grip fixtures to secure the assembly with the pipe being capped and such as to sustain the pressure to retain the assembly after the pipe is capped. When pipe adapter is fixed securely, with the valves in fully open position, the encased clamp and valves assembly is slipped over the pipe being capped. The flanges are matched with the pipe adapter and then bolted securely. At this point fluid flows out through the secondary valve. The primary valve is then closed, and if necessary, bleed-through valves may be required to ease the pressure during this operation. Once the primary valve is closed, the secondary valve is then closed. Once fluid flow is controlled, the blind flange may be installed on the secondary valve.

The AFHPP may be used to temporary plug the pipe while the AFHPC is being installed as a permanent cap.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for plugging the active flow of fluids in a pipe, said apparatus
    being sized for insertion into said pipe,
    said apparatus having multi-stages of external pressure grips,
    said apparatus having multi-stages of pneumatic or hydraulic cylinders,
    said cylinders having hydraulic or pneumatic charging ports,
    said apparatus having multi-stages of compression plugs,
    said external pressure grips being activated by said multi-stage pneumatic or hydraulic cylinders, said external pressure grips being set in arrays of varied spacing in said different stages to serve as grips to the internal wall of said pipe, each of said external pressure grips being shaped at both ends to minimize pressure from fluid flow and said grips being provided with surface projections that press against said pipe internal wall, the number of said external grips being increased and said grips' inter spacing being decreased at said grips' later stages to minimize pressure to said expandable plugs before said plugs are activated, said apparatus having a front tip section, and upon activation of said apparatus, said multi-stage cylinders become fully sequentially engaged, said multi-stages of external pressure grips then anchoring into said pipe's internal walls, and all of said expandable compression plugs pressing against the internal walls of said pipe, thereby plugging the flow of fluids in said pipe.

2. The apparatus of claim 1, said apparatus being installed by a fixed or mobile mechanical drive unit, or guided propulsion equipment for underwater applications.

3. The apparatus of claim 1 wherein said multi-stage cylinders activate external pressure grips sequentially to secure the apparatus within the internal wall of said pipe being plugged.

4. The apparatus of claim 1 wherein said multi-stage compression plugs are used to stop the flow of fluid in the pipe being plugged.

5. The apparatus of claim 1, wherein said external pressure grips are shaped to minimize pressure from fluid flow and provided with surface projections to provide a secure grip within the internal wall of the pipe being plugged.

6. The apparatus of claim 1, wherein the multi-stage compression plugs are activated by pressure from the hydraulic or pneumatic cylinders whereby said compression plugs' outside diameters are expanded to apply pressure to the inner wall of the pipe being plugged, and where said multi-stage compression plugs are made of rubber, or elastomeric materials.

7. The apparatus of claim 1, wherein said multi-stage compression plug has a first stage, said first stage being grooved along the direction of fluid flow to reduce the pressure on the plug, and said multi-stage compression plugs having a second and succeeding stages, and said second and succeeding stages not being grooved, and said multi-stage compression plugs having a last stage, said last stage stopping the flow of fluid in the pipe.

8. The apparatus of claim 1, wherein said front tip section is geometrically shaped like a cone head, to minimize the resistance of fluid flow to said apparatus.

9. A method for plugging the active flow of fluids in a pipe, said method comprising:

the step of having a device to stop the active flow of fluids in a pipe, the step of said having said device being sized for insertion into said pipe, the step of said device having multi-stage external pressure grips, the step of said device having multi-stages of pneumatic or hydraulic cylinders, the step of said device's cylinders having hydraulic or pneumatic charging ports, the step of said device having multi-stages of compression plugs, the step of said grips being activated by said multi-stage cylinders, the step of said grips being set in arrays of varied spacing in different stages to serve as grips to the internal wall of said pipe, the step of each of said external pressure grips being shaped at both ends to minimize pressure from fluid flow and said grips being provided with surface projections that press against said pipe internal wall, the number of said external pressure grips being increased and said external pressure grips' inter spacing being decreased at said grips' later stages to minimize pressure to said expandable multi-stage compression plugs, before said plugs are activated, and the step of inserting said device into said pipe, the step of activating said device, whereupon said multi-stage cylinders' stages become fully sequentially engaged, said multi-stages of said external pressure grips then anchoring into said pipe's internal walls, and all of said expandable compression plugs pressing against the internal walls of said pipe, thereby stopping the flow of fluids in said pipe.

10. The method apparatus of claim 9, further having the step of said device's multi-stage compression plugs having a first stage, said first stage being grooved along the direction of fluid flow to reduce the pressure on the plug, and said multi-stage compression plugs having a second and succeeding stages, and said second and succeeding stages not being grooved, and said multi-stage compression plugs having a last stage, said last stage stopping the flow of fluid in the pipe.

\* \* \* \* \*